United States Patent [19]

Schwaiger et al.

[11] Patent Number: 4,906,736
[45] Date of Patent: Mar. 6, 1990

[54] COPPER COMPLEX FORMAZAN COMPOUNDS CONTAINING A PHENYLAMINOTRIAZINYLAMINO GROUP WITH A FIBER-REACTIVE GROUP OF THE VINYLSULFONE SERIES AND AN ALKYL AMINO SUBSTITUENT IN THE PHENYL MOIETY SUITABLE AS FIBER-REACTIVE DYESTUFFS

[75] Inventors: Günther Schwaiger, Frankfurt am Main; Hartmut Springer, Königstein/Taunus; Werner H. Russ, Hofheim am Taunus, all of Fed. Rep. of Germany

[73] Assignee: Hoechst Aktiengesellschaft, Frankfurt am Main, Fed. Rep. of Germany

[21] Appl. No.: 159,188

[22] Filed: Feb. 23, 1988

[30] Foreign Application Priority Data

Feb. 24, 1987 [DE] Fed. Rep. of Germany ....... 3705789

[51] Int. Cl.$^4$ .................. C09B 62/018; C09B 62/04; C09B 62/503; D06P 1/382
[52] U.S. Cl. .................................. 534/618; 534/588; 534/598; 534/600; 534/652; 534/887
[58] Field of Search ......................................... 534/618

[56] References Cited

U.S. PATENT DOCUMENTS 4,720,542  1/1988  Omura et al. .................. 534/618
4,786,721  11/1988  Tzikas et al. .................. 534/618 X

FOREIGN PATENT DOCUMENTS 0021351  4/1983  European Pat. Off. ............ 534/618
0099721  10/1986  European Pat. Off. ............ 534/618
2026527  2/1980  United Kingdom .................. 534/618

OTHER PUBLICATIONS

Nippon Kayaku Co., *Chem. Abs.* 97:183939h (1982), corresp. to JP 82/92054 (6–1982).

*Primary Examiner*—Floyd D. Higel

[57] ABSTRACT

Water-soluble copper complex formazan compounds which conform to the general formula (1) below and have useful fiber-reactive dye properties and dye carboxamido- and/or hydroxy-containing material, in particular cellulose fibers, in fast blue shades.

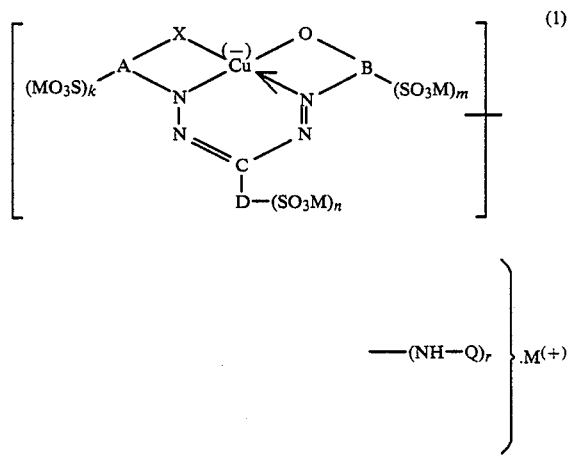

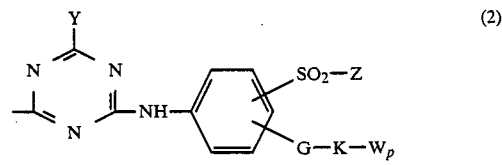

in which:
M is hydrogen or a salt-forming metal atom,
k, m and n each denote the number zero, 1 or 2, the sum (k+m+n) being equal to 1 to 4,
A is a benzene or napththalene ring which additionally can contain the fiber-reactive group —NH—Q and further substituents,
B is a benzene or naphthalene ring which additionally contains the fiber-reactive group —NH—Q and further substituents,
D is substituted or unsubstituted alkylene of 1 to 8 carbon atoms or is a benzene or naphthalene ring having optionally additional substituents or is a heterocyclic radical,
X is a sulfo group or an oxy or carbonyloxy group,
r is the number 1 or 2,
Q is a radical of the formula (2)

(2)

$$\begin{array}{c} Y \\ | \\ N \diagup\diagdown N \\ | \quad \| \\ \diagdown N \diagup \text{—NH—} \diagup\!\!\!\diagdown \text{—SO}_2\text{—Z} \\ \phantom{xxxxxxxxxxxxxxx} \diagdown \text{—G—K—W}_p \end{array}$$

in which
Y is halogen, Z is vinyl or a β-substituted ethyl,
G is the thio or an amino group —N(R)— where R is equal to hydrogen or to low, substituted or unsubstituted alkyl or a group —K—$W_p$ defined hereinafter,
K is alkylene or arylene or arylene-alkylene or alkylene-arylene whose arylene and alkylene radicals can be substituted and/or interrupted by a hetero group,
W is a water-solubilizing group and p is the number 1, 2 or 3,
the group —NH—Q is bonded to an aromatic carbon atom of A or B or D or to an aliphatic carbon atom of D or of a substituent on A or B, in the case of r=2, however, not simultaneously to A, B or D.

20 Claims, No Drawings

COPPER COMPLEX FORMAZAN COMPOUNDS CONTAINING A PHENYLAMINOTRIAZINYLAMINO GROUP WITH A FIBER-REACTIVE GROUP OF THE VINYLSULFONE SERIES AND AN ALKYL AMINO SUBSTITUENT IN THE PHENYL MOIETY SUITABLE AS FIBER-REACTIVE DYESTUFFS

DESCRIPTION

The present invention relates to the technical field of fiber-reactive metal complex formazan dyes.

British Patent Application Publication No. 2,026,527 A and European patent specification Nos. 0,021,351B and 0,099,721B already disclose copper complex formazan compounds which contain a fiber-reactive radical composed of a monohalotriazinyl radical and, bonded thereto via a phenylamino group, radical of the vinyl sulfone series.

The present invention now provides novel, useful copper complex formazan compounds which conform to the general formula (1)

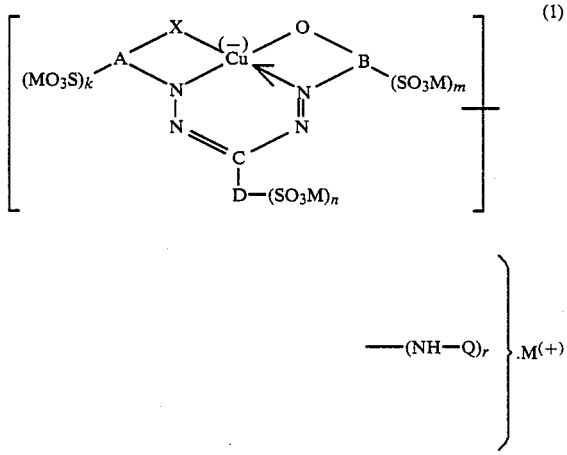

in which

M is a hydrogen atom or a salt-forming metal atom, preferably an alkali metal, such as sodium, potassium or lithium, k is the number zero, 1 or 2 (where in the case of k=zero this group stands for a hydrogen atom), preferably zero or 1, m is the number zero, 1 or 2 (where in the case of m=zero this group stands for a hydrogen atom), and n is the number zero, 1 or 2 (where in the case of n=zero this group stands for a hydrogen atom), preferably zero or 1, the sum of (k+m+n) being equal to an integer from 1 to 4, preferably 2 or 3, in particular 2, A is a benzene ring or a naphthalene ring, which each, aside from the groups drawn in, can be substituted by the indicated fiber-reactive group —NH—Q defined hereinafter and/or by 1 or 2, preferably 1, other substituents, such as, for example, halogen, such as chlorine and bromine, nitro, carboxy, alkyl of 1 to 4 carbon atoms, such as methyl and ethyl, alkoxy of 1 to 4 carbon atoms, such as methoxy and ethoxy, sulfamoyl, N-($C_1$-$C_4$)-alkylsulfamoyl, N,N-di-[($C_1$-$C_4$)-alkyl]-sulfamoyl, ($C_1$-$C_4$)-alkylsulfonyl, such as ethylsulfonyl, and phenylsulfonyl, preferably halogen, such as chlorine, and alkoxy of 1 to 4 carbon atoms, such as methoxy, the radical X and the nitrogen atom being bonded to A preferably in the ortho-position relative to each other, B is a benzene ring or a naphthalene ring, which each, in addition to the groups drawn in, can be substituted by the indicated fiber-reactive group —NH—Q defined hereinafter and/or by 1 or 2, preferably 1, other substituents, such as, for example, halogen, such as chlorine and bromine, nitro, alkyl of 1 to 4 carbon atoms, such as methyl and ethyl, alkoxy of 1 to 4 carbon atoms, such as methoxy and ethoxy, sulfamoyl, N-($C_1$-$C_4$)-alkylsulfamoyl, N,N-di-[($C_1$-$C_4$)-alkyl]-sulfamoyl, ($C_1$-$C_4$)-alkylsulfonyl, such as ethylsulfonyl, and phenylsulfonyl, the oxygen and nitrogen atoms bonded to B preferably being bonded to B in the ortho-position relative to each other, D is a straight-chain or branched alkylene group of 1 to 8 carbon atoms, preferably of 1 or 2 carbon atoms, which can be substituted, for example by phenyl, and is preferably a benzyl or styryl radical, or D is a benzene or naphthalene ring which in either case, aside from —($SO_3M$)$_n$, can be additionally substituted by 1 or 2 substituents, as for example by indicated fiber-reactive group —NH—Q defined hereinafter and/or by substituents from the group consisting of halogen, such as bromine and chlorine, alkyl of 1 to 4 carbon atoms, such as methyl and ethyl, alkoxy of 1 to 4 carbon atoms, such as methoxy and ethoxy, nitro, hydroxy, alkanoylamino of 2 to 5 carbon atoms, carboxy and carbalkoxy of 2 to 5 carbon atoms, such as carbomethoxy and carbethoxy, of which preferably chlorine, methyl and methoxy, or D is a heterocyclic radical, such as, for example, the radical of a furan, thiophene, pyrrole, imidazole, pyrazole, pyridine, quinoline or benzimidazole, X is a group of the formula —$SO_3$(—), the bond to the copper atom and the negative charge thereon not being included, or preferably an oxy group —O— and in particular a carbonyloxy group —CO—O—, r is the number 1 or 2, preferably 1, Q is a group of the general formula (2)

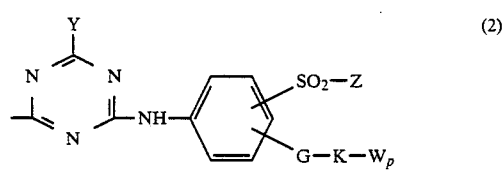

in which

Y stands for a halogen atom, such as a fluorine atom or preferably a chlorine atom, Z is the vinyl group or an ethyl group which is substituted in the β-position by an alkali-eliminable substituent, G is a group of the formula —S— or preferably —N(-R)—, in which R stands for a hydrogen atom or an alkyl group of 1 to 4 carbon atoms, which can be substituted, for example by one or two, preferably one, substituent from the group consisting of hydroxy, phenyl, sulfo, carboxy, sulfato, phosphato and alkanoyloxy of 2 to 5 carbon atoms, or R is a below-defined group —K—$W_p$, K is an alkylene group or an arylene radical or an arylenealkylene or an alkylenearylene radical, where not only the alkylene but also the arylene radicals can be substituted and where not only the alkylene radicals but also the alkylene and arylene radicals in the alkylene-arylene and arylene-alkylene radicals can additionally be interrupted by at least one hetero group, for example 1, 2 or 3 hetero groups, W is a water-solubilizing group, such as, for example, a hydroxy, sulfato, sulfo, carboxy, phosphato or phosphono group, of which preferably sulfato and sulfo groups, and p stands for the number 1, 2 or 3, preferably 1 or 2, the fiber-reactive grouping —NH—Q is bonded to an aromatic carbon atom of a benzene or naphthalene ring of A or B or of D or to an aliphatic carbon atom of D or of a substituent on A or B, although in the case of r=2 the two —NH—Q groups are not simultaneously bonded to A or to B or to D.

The symbols in the formula (1) can have meanings identical to or different from one another.

Alkyl groups of 1 to 4 carbon atoms are preferably the methyl and ethyl group; alkoxy groups of 1 to 4 carbon atoms are preferably the methoxy and ethoxy group.

Particularly preferably the radical G is an amino group of the formula —NH— or —N(CH$_3$)—.

In the group of the formula (2), the group of the formula —SO$_2$—Z is preferably bonded to the benzene nucleus in the meta-position relative to the amino group on the triazine radical, and the grouping of the formula —G—K—W$_p$ is preferably bonded in the para-position relative to this amino group.

Preferably, D is a benzene ring which, aside from the indicated grouping —(SO$_3$M)$_n$, can be substituted by 1 or 2 substituents from the group consisting of alkyl of 1 to 4 carbon atoms, alkoxy of 1 to 4 carbon atoms, carboxy, carbalkoxy of 2 to 5 carbon atoms and chlorine.

The alkylene groups (radicals) in the radical K are preferably straight-chain or branched alkylene groups of 1 to 6 carbon atoms, preferably 1 to 4 carbon atoms, or, if they are interrupted by hetero groups, of 2 to 8 carbon atoms, preferably 2 to 6 carbon atoms. The arylene radicals in the radical K are not only unsubstituted but also substituted arylene radicals. Arylene radicals are preferably the phenylene and naphthylene groups. The arylene radicals can be substituted by substituents, preferably 1 or 2 substituents, from the group consisting of alkoxy of 1 to 4 carbon atoms, alkyl of 1 to 4 carbon atoms, halogen, such as chlorine and bromine, sulfo and carboxy, of which preferably methoxy, ethoxy, methyl, chlorine and sulfo.

Hetero groups which can interrupt the alkylene radicals of the radical K or alkylene and arylene radicals in the alkylene-arylene and arylene-alkylene radicals of the radical K are for example groups of the formulae —O—, —S—, —SO$_2$—, —CO—, —NH—CO—, —CO—NH—, —NH— and —N(R')—, in which R' stands for a hydrogen atom or an alkyl group of 1 to 4 carbon atoms, which can be substituted, for example by one or two, preferably one, substituent from the group consisting of hydroxy, sulfo, carboxy, sulfato, phosphato, phenyl and alkanoyloxy of 2 to 5 carbon atoms, or R' is an alkanoyl group of 2 to 5 carbon atoms, such as the acetyl group. Preferred hetero groups are groups of the formulae —O—, —NH—CO—, —NH— and —N(R')—, in which R' stands for the methyl or ethyl group.

Substituents in the β-position on the ethyl group of the formula radical Z which are eliminable by means of an alkali, thereby converting this β-substituted ethyl group into the vinyl group, are for example the phosphato, sulfato and thiosulfato group, of which preferably the sulfato group.

A sulfo group is a group of the general formula —SO$_3$M, a carboxyl group is a group of the general formula —COOM, a thiosulfato group is a group of the general formula —S—SO$_3$M, a phosphato group is a group of the general formula —OPO$_3$M$_2$, a phosphono group is a group of the general formula —PO$_3$M, and a sulfato group is a group of the general formula —O-SO$_3$M, where in each case M has the above-mentioned meaning.

The novel compounds can be present in the acid form and in the form of their salts. They are preferably in the form of their salts, in particular the alkali metal salts, and also preferably used in the form of these salts for dyeing (understood here and hereinafter in the general sense and as including printing) hydroxy-and/or carboxamido-containing materials, in particular fiber materials.

Of the compounds according to the invention of the general formula (1), preference is given to those which conform to the general formula (1a)

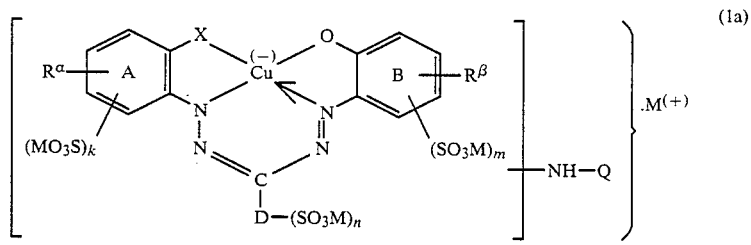

(1a)

in which

R$^\alpha$ is a hydrogen atom or the indicated group —NH—Q or a methyl, methoxy, ethoxy or nitro group or a chlorine atom, preferably a group —NH—Q and in particular a hydrogen atom, R$^\beta$ is a hydrogen atom or the indicated group —NH—Q or a methyl, methoxy, ethoxy, ethylsulfonyl or nitro group or a chlorine atom, preferably a hydrogen atom and in particular a group —NH—Q, k is the number zero, 1 or 2, preferably zero or 1, m is the number zero, 1 or 2, preferably 1 or 2, and n is the number zero, 1 or 2, preferably zero or 1, the sum of (k+m+n) being equal to 2 or 3, preferably 2, M, D, Q and X have the above-mentioned, in particular preferred meanings, the fiber-reactive grouping —NH—Q is bonded to the benzene ring A or to the benzene ring B or to an aromatic carbon atom of a benzene or naphthalene ring of D, preferably to A or B, in particular preferably to B.

Particular preference is further given to compounds conforming to a general formula (1b) and in particular (1c)

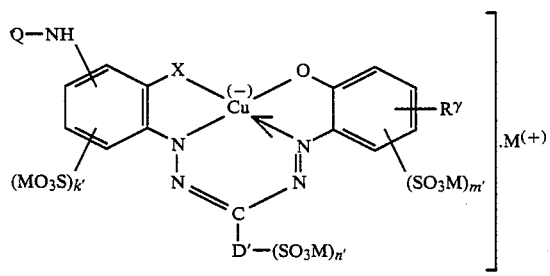
(1b)

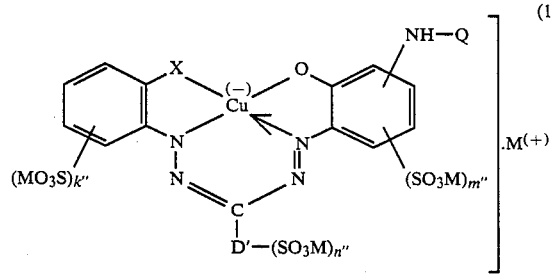
(1c)

in which
k' is the number or zero or 1, preferably zero,
m' is the number 1 or 2 and
n' denotes the number zero, 1 or 2, preferably zero or 1, the sum of (k'+m'+n') being equal to 2 or 3,
k" is the number zero, 1 or 2, preferably 1,
m" is the number zero or 1, preferably 1,
n" is the number zero, 1 or 2, preferably zero or 1, the sum of (k"+m"+n") being equal to 2 or 3, preferably 2,
$R^\gamma$ is a methoxy, ethoxy, methyl or ethylsulfonyl group or a chlorine atom or preferably a hydrogen atom,
D' has one of the meanings mentioned above for D, in particular one of the preferred meanings, and is particularly preferably a benzene ring which, aside from the grouping —(SO$_3$M)$_{n'}$ or —(SO$_3$M)$_{n''}$, can be substituted by a methoxy, ethoxy or methyl group or a chlorine atom, and M, Q and X have the above-mentioned, in particular preferred, meanings.

In the formula (1b), the group of the formula Q—NH— is preferably bonded to the benzene ring in the para-position relative to the nitrogen atom and, in the formula (1c), preferably to the benzene ring in the ortho-position relative to the oxygen atom. In the formula (1c), a sulfo group (MO$_3$S)$_{k''}$— is preferably in the meta- or para-position relative to the group X and particularly preferably in the para-position relative to the group X, and the group X is particularly preferably the carbonyloxy group.

Particular preference is given to those compounds according to the invention which conform to the general formula (1d)

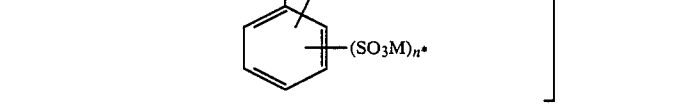
(1d)

in which
k* is the number zero or 1, preferably 1, and
n* is the number zero or 1, preferably zero,
the sum of (k*+n*) preferably being equal to 1,
$R^\delta$ is a hydrogen atom or a methyl, methoxy or ethoxy group or a chlorine atom and
M and Q have the above-mentioned, particularly preferred meanings.

In the formula (1d), a sulfo group (MO$_3$S)$_{k*}$— is preferably in the meta- or para-position relative to the group X and particularly preferably in the para-position relative to the group X.

In the compounds according to the invention of the general formula (1), hence also in the preferred compounds of the general formulae (1a) to (1d), the radical Q is preferably a radical of the general formula (2a)

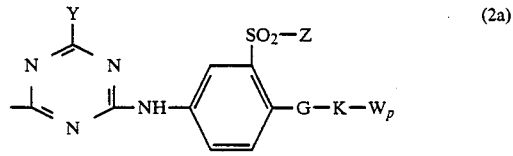
(2a)

in which Y, Z, G, K, W and p have the above-mentioned, particularly preferred meanings. Preferably, in the formula (2a), the group Z is a β-sulfatoethyl group, the radical G is preferably a sulfur atom or a group of the formula —NH— or —N(R')— with R' being equal to hydrogen or alkyl of 1 to 4 carbon atoms, of which in particular such as methyl and ethyl, the radical K is preferably the ethylene group or the n-propylene group or a group of the formula —CH$_2$—CH$_2$—O—CH$_2$—CH$_2$— or particularly preferably a group of the formula —CH$_2$—CH$_2$—NH—CO—CH$_2$—CH$_2$—, the radical W is preferably a sulfato, sulfo or carboxy group, and p is preferably the number 1.

If G stands for a sulfur atom, K is particularly preferably the ethylene group and W the sulfato group with p being equal to 1. If G stands for an amino group of the formula —N(R')—, K is preferably the ethylene or n-propylene group or the group —CH$_2$—CH$_2$—O—CH$_2$—CH$_2$— or —CH$_2$—CH$_2$—NH—CO—CH$_2$—CH$_2$— and W the sulfo, sulfato or carboxy group with p being equal to 1. Particularly preferably, in the formula (2a), the radical —G—K—W$_p$ is the ($\beta$-sulfatoethyl)-amino or the N-methyl-N-($\beta$-sulfatoethyl)-amino group or the N-[$\beta$-($\beta'$-carboxyethyl)-carboxamindo]-ethylamino group of the formula —NH—CH$_2$—CH$_2$—NH—CO—CH$_2$—CH$_2$—COOM with M of the above-mentioned meaning.

Particularly noteworthy are copper complex formazan compounds according to the invention which conform to the general formula (1e)

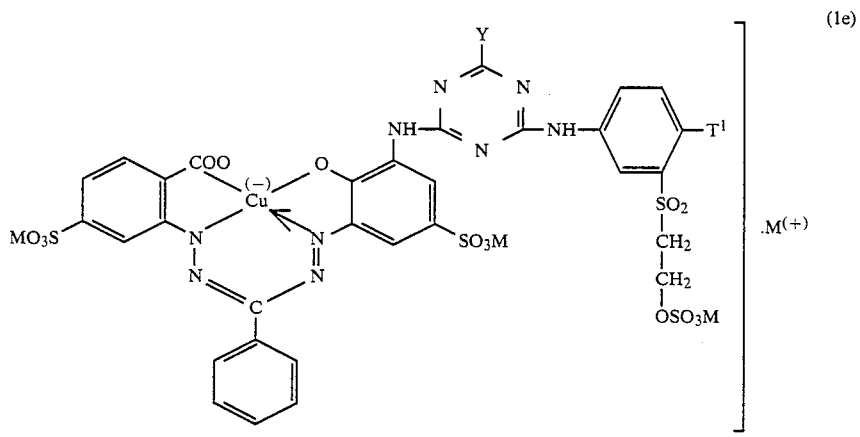

in which M has the above-mentioned meaning, Y denotes a chlorine or fluorine atom and T$^1$ stands for the $\gamma$-sulfatopropylamino, $\beta$-sulfatopropylamino or the N-[$\beta$-($\beta'$-sulfatoethoxy)-ethyl]-amino group or in particular the $\beta$-sulfatoethylamino, N-methyl-N-($\beta$-sulfatoethyl)-amino, N-[$\beta$-($\beta'$-carboxyethyl)-carboxamido]-ethylamino, $\beta$-sulfatoethylamino or $\beta$-sulfatoethylthio group.

The present invention also relates to a process for preparing the novel compounds of the general formula (1). This process comprises reacting cyanuric chloride or cyanuric fluoride in any desired order with an amino-containing copper complex formazan compound of the general formula (3)

in which the individual symbols have the meanings mentioned for formula (1), the amino group which is present once or twice in the copper complex formazan molecule (r=1 or 2) being bonded—similarly to the fiber-reactive grouping —NH—Q in compounds of the formula (1)—to an aromatic carbon atom of the benzene or naphthalene ring of A or of B or of D or to an aliphatic carbon atom of D or of a substituent of A or B, but in the case of r=2 the two amino groups not being bonded simultaneously to A or to B or to D, and with an aniline compound of the general formula (4)

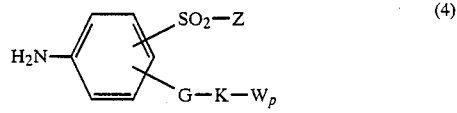

in which G, K, W, p and Z have the above-mentioned meanings.

The reactions according to the invention generally take place in an aqueous medium at a pH between 2 and 8, preferably between 3 and 6, and at a reaction temperature between −5° C. and +50° C., preferably between 0° and 40° C. Preferably, the amino compound reacted with cyanuric chloride or cyanuric fluoride in the 1st reaction step of the process according to the invention to give a monocondensation product is that which is less reactive toward cyanuric chloride or cyanuric fluoride.

In the process variants according to the invention of the process of preparation according to the invention, it is thus possible to prepare a copper complex formazan compound according to the invention by reacting a dihalotriazinylamino copper formazan compound of the general formula (5)

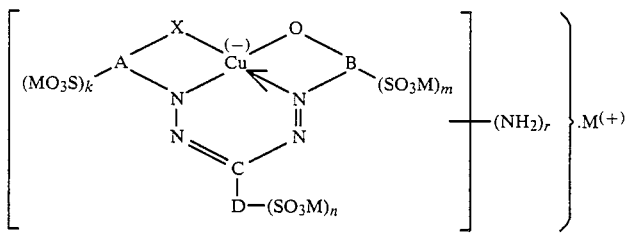

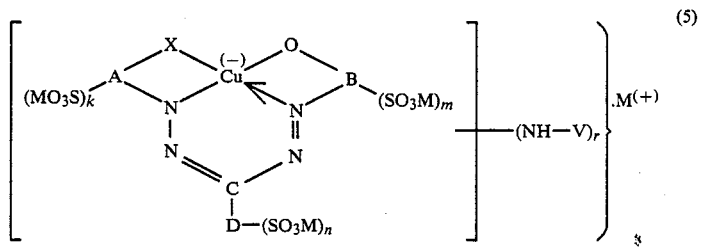

in which V is a radical of the general formula (5a)

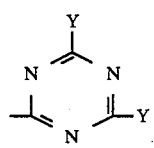

in which both the Y's have the above-mentioned meanings but are identical to each other, and preferably both the Y's each stand for a fluorine atom or for a chlorine atom, and in which the other symbols have the meanings mentioned for the formula (1), the group —N—H—V, which is present once or twice in the copper complex formazan molecule, is bonded—similarly to the fiber-reactive grouping —NH—Q in the compounds of the formula (1)—to an aromatic carbon atom of a benzene or naphthalene ring of A or of B or of D or to an aliphatic carbon atom of D or of a substituent on A or B, but the two —NH—V groups in the case of r=2 are not bonded at the same time to A or to B or to D, with an aniline compound of the general formula (4) mentioned and defined above, or by reacting a dihalotriazinylamino compound of the general formula (6)

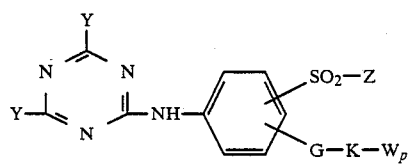

in which each of the two Y's stands for a fluorine atom or for a chlorine atom and G, K, W, p and Z have the above-mentioned meanings, with an amino copper formazan compound of the general formula (3) mentioned and defined above.

The 1st condensation reaction to give the monocondensation product, if the reaction is carried out with cyanuric chloride, preferably takes place at a pH of 2 to 4, in particular of 3 to 4, and if the reaction is carried out with cyanuric fluoride at a pH between 5 and 7, preferably between 5.5 and 6.3, and, irrespectively of whether the reaction is carried out with cyanuric chloride or with cyanuric fluoride, preferably at a reaction temperature of $-5°$ C. to $+20°$ C., in particular $0°$ to $10°$ C. The 2nd condensation reaction to give the copper complex formazan compound according to the invention is then preferably carried out at pH of 4 to 7.5, if cyanuric chloride is used in particular at a pH of 4 to 6, and preferably at a reaction temperature of $20°$ to $50°$ C., in particular $30°$ to $40°$ C., and if cyanuric fluoride is used in particular at a pH between 5 and 6 and at a temperature between $5°$ and $30°$ C., in particular between $10°$ and $25°$ C.

The amino copper complex formazan starting compounds of the general formula (3) are either known, for example from European Patent Application Publications Nos. 0,021,351A and 0,099,721A, British patent specification No. 1,502,998 and U.S. Pat. Nos. 3,627,749, 3,660,393, 4,024,123 and 4,556,706, or can be prepared in a similar manner to the directions given therein. For instance, in general the starting point is a customary starting compound for the copper complex formazan chromophore, namely an arylhydrazone of an arylhydrazine having an aryl component A which is in accordance with the directions appertaining to the formula (1) and an aldehyde $(SO_3M)_n$—D—CHO and also an arylamine containing a phenolic hydroxy group and having an aryl component B which is in accordance with the directions appertaining to the formula (1), one of these components—or in the case of r=2 both of these components—having the amino group which is to be present in the copper complex formazan starting compound of the general formula (3) either in the form of a nitro group or in the form of a lower alkanoylamino group, such as acetylamino group, or in the form of an amino group provided with another customary protective group. Initially a copper complex formazan compound is obtained, which conforms to the general formula (3) except that in place of the amino group it contains a nitro group or an alkanoylamino group, such as acetylamino group, or an amino group provided with another protective group. The nitro group can then be reduced to an amino group in a conventional manner, and the protected amino group, which comprises for example an alkanoylamino group, can be converted by hydrolysis, preferably alkaline hydrolysis, in a conventional manner into an amino group, and thus into the amino starting compound of the general formula (3). The arylhydrazines are obtained in a long-established manner by reducing the diazonium salts of the corresponding arylamines of aryl component B. Such procedures are known from the above-mentioned publications.

Arylamino compounds comprising an aryl component B and a phenolic group bonded thereto which are suitable for use as starting components for preparing the starting copper complex formazan chromophore by reaction with an appropriate arylhydrazone and a customary copper-donating agent and which can, if desired, also contain a nitro group or a protected amino group, are for example 2-aminophenol, 4-methyl-2-aminophenol, 5-methyl-2-aminophenol, 4-sulfo-2-aminophenol, 5-sulfo-2-aminophenol, 4-sulfo-6-carboxy-2-aminophenol, 4-methoxy-2-aminophenol, 5-methylsulfonyl-2-aminophenol, 4-(N-methylsulfamoyl)-2-aminophenol, 4-(N,N-dimethylsulfamoyl)-2-aminophenol, 5-nitro-2-aminophenol, 4-bromo-2-aminophenol, 4,6-disulfo-2-aminophenol, 4-sulfo-6-acetylamino-2-aminophenol, 6-nitro-4-sulfo-2-aminophenol, 4-nitro-6-sulfo-2-aminophenol, 4-acetylamino-6-sulfo-2-aminophenol, 4-chloro-6-sulfo-2-aminophenol, 6-chloro-4-sulfo-2-aminophenol, 4-methylsulfonyl-2-aminophenol, 4-butylsulfonyl-2-aminophenol, 4-ethylsulfonyl-2-aminophenol, 4-ethylsulfonyl-6-sulfo-2-aminophenol, 4-sulfamoyl-2-aminophenol, 1-amino-2-hydroxynaphthalene-4,6-disulfonic acid, 1-amino-2-hydroxy-6-nitro-naphthalene-4-sulfonic acid, 1-amino-2-hydroxy-6-chloronaphthalene-4-sulfonic acid and 4-methyl-6-sulfo-2-aminophenol.

Starting arylamines comprising an aryl component A, serving to prepare the copper complex formazan starting chromophore and optionally containing a nitro group or a protective amino group and initially converted by diazotization and reduction by means of sodium sulfite into an arylhydrazine derivative and, after their reaction with an aldehyde component, reacted as arylhydrazone with a customary copper-donating agent and arylamine component B are for example 2-aminophenol, 4-methyl-2-aminophenol, 5-methyl-2-aminophenol, 4-sulfo-2-aminophenol, 5-sulfo-2-aminophenol, 4-sulfo-6-carboxy-2-aminophenol, 4-methoxy-2-aminophenol, 5-methylsulfonyl-2-aminophenol, 4-(N-methylsulfamoyl)-2-aminophenol, 4-(N,N-dimethylsulfamoyl)-2-aminophenol, 5-nitro-2-aminophenol, 4-bromo-2-aminophenol, 4,6-disulfo-2-aminophenol, 4-sulfo-6-acetylamino-2-aminophenol, 6-nitro-4-sulfo-2-aminophenol, 4-nitro-6-sulfo-2-aminophenol, 4-acetylamino-6-sulfo-2-aminophenol, 4-chloro-6-sulfo-2-aminophenol, 6-chloro-4-sulfo-2-aminophenol, 4-methylsulfonyl-2-aminophenol, 4-butylsulfonyl-2-aminophenol, 4-ethylsulfonyl-2-aminophenol, 4-sulfamoyl-2-aminophenol, 1-amino-2-hydroxynaphthalene-4,6-disulfonic acid, 1-amino-2-hydroxy-6-nitronaphthalene-4-sulfonic acid, 1-amino-2-hydroxy-6-chloronaphthalene-4-sulfonic acid, 4-methyl-6-sulfo-2-aminophenol, 2-aminobenzoic acid, 4-sulfo-2-aminobenzoic acid, 5-sulfo-2-aminobenzoic acid, 5-nitro-2-aminobenzoic acid, 4-chloro-2-aminobenzoic acid, 5-chloro-2-aminobenzoic acid, 4-methoxy-2-aminobenzoic acid, 4-acetylamino-2-aminobenzoic acid, 5-acetylamino-2-aminobenzoic acid, 2,5-dicarboxyaniline and 2,5-disulfoaniline.

Aldehyde components for synthesizing the copper complex formazan starting chromophore and optionally containing a nitro group or a protected amino group are for example benzaldehyde, 2-methylbenzaldehyde, 3-methylbenzaldehyde, 4-methylbenzaldehyde, 3-sulfo-4-methylbenzaldehyde, 2-methoxybenzaldehyde, 3-methoxybenzaldehyde, 4-methoxybenzaldehyde, 4-methoxy-3-chlorobenzaldehyde, 2-nitrobenzaldehyde, 3-nitrobenzaldehyde, 2-hydroxybenzaldehyde, 2-chlorobenzaldehyde, 4-chlorobenzaldehyde, 2,4-dichlorobenzaldehyde, 5-sulfo-2-chlorobenzaldehyde, 2-sulfobenzaldehyde, 3-sulfobenzaldehyde, 4-sulfobenzaldehyde, 2,4-disulfobenzaldehyde, 2-acetylaminobenzaldehyde, 4-acetylaminobenzaldehyde, 3-aminobenzaldehyde, 2-sulfo-4-nitrobenzaldehyde, 2-nitro-3-methylbenzaldehyde, 6-nitro-3-methylbenzaldehyde, 2-chloro-6-nitrobenzaldehyde, 1-naphthaldehyde, 2-naphthaldehyde, furan-2-aldehyde, thiophene-2-aldehyde, pyrrole-2-aldehyde, imidazole-2-aldehyde, pyrazole-5-aldehyde, pyridine-2-aldehyde, pyridine-3-aldehyde, pyridine-4-aldehyde, pyrimidine-5-aldehyde, quinoline-4-aldehyde, benzimidazole-2-aldehyde, acetaldehyde, propionaldehyde, n-butyraldehyde, enanthaldehyde, acrylaldehyde, crotonaldehyde, phenacetaldehyde or cinnamaldehyde.

Starting aniline compounds conforming to the general formula (4) are known for example from European Patent Application Publications Nos. 0,153,599A, 0,171,611A and 0,197,418A or can be prepared in a similar manner to the directions given therein, including for example from the corresponding aniline compounds of the general formula (4a)

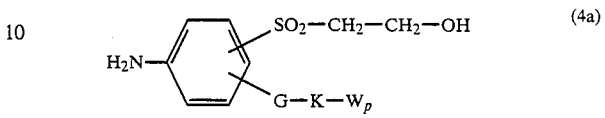

in which G, K, W and p have the above-mentioned meanings, in a manner similar to known procedures by reaction with customary sulfating or phosphating agents or with another esterifying or acylating agent, such as an anhydride of an alkanecarboxylic acid or a carboxylic acid chloride of an aromatic carboxylic acid or sulfochloride of an aromatic sulfonic acid, thereby obtaining the corresponding β-sulfatoethylsulfonyl or β-phosphatoethylsulfonyl derivatives or the corresponding β-acyloxyethylsulfonyl derivatives containing the acyl radical of a carboxylic or sulfonic acid as per formula (4). From the β-sulfatoethylsulfonyl compound conforming to the general formula (4) it is then possible for example to obtain in a conventional manner the vinylsulfonyl compound thereof, which in turn can be converted into other compounds of the general formula (4) having a β-substituted ethylsulfonyl group, such as for example a β-thiosulfatoethylsulfonyl group.

Aniline compounds of the general formula (4) are for example 3-(β-sulfatoethylsulfonyl)-4-N-(β-sulfatoethyl)aminoaniline, 3-(β-thiosulfatoethylsulfonyl)-4-N-(β-thiosulfatoethyl)-aminoaniline, 3-(β-phosphatoethylsulfonyl)-4-N-(β-phosphatoethyl)-aminoaniline, 3-(β-sulfatoethylsulfonyl)-4-N-(γ-sulfato-n-)aminoaniline, 3-(β-sulfatoethylsulfonyl)-N-(ω-sulfato-n-hexyl)-aminoaniline, 3-(β-sulfatoethylsulfonyl)-4-(β-sulfatoethyl)-thioaniline, 3-(β-sulfatoethylsulfonyl)-N-(β-sulfoethyl)-aminoaniline, 3-(β-sulfatoethylsulfonyl)-4-[N-methyl-N-(β-sulfoethyl)]-aminoaniline, 3-(β-sulfatoethylsulfonyl)-4-[N-methyl-N-(β-sulfatoethyl)]-aminoaniline, 3-(β-sulfatoethylsulfonyl)-4-[β-(β'-sulfatoethoxy)-ethyl]-aminoaniline, 3-(β-sulfatoethylsulfonyl)-4-N-(α,β-disulfato-n-propyl)-aminoaniline, 3-(β-sulfatoethylsulfonyl)-4-N-(carboxymethyl)-aminoaniline, 3-(β-sulfatoethylsulfonyl)-4-N-(β-carboxyethyl)-aminoaniline, 3-(β-sulfatoethylsulfonyl)-4-N-[β-(β'-sulfatoethylamino)-ethyl]-aminoaniline, 3-(β-sulfatoethylsulfonyl)-4-N-{β-[N'-methyl-N'-(β'-sulfatoethyl)-amino]-ethyl}aminoaniline, 3-(β-sulfatoethylsulfonyl)-4-N-[β-(β'-carboxypropionylamido)-ethyl]-aminoaniline, 3-(β-sulfatoethylsulfonyl)-4-N-[β-(sulfoacetamido)-ethyl]-aminoaniline and 3-(β-sulfatoethylsulfonyl)-4-N-[β-(4'-sulfophenyl)-ethyl]-aminoaniline.

The copper complex formazan compounds of the general formula (1) prepared according to the invention are isolated from their synthesis batches in a commonly known manner, either by precipitation from the reaction medium by means of an electrolyte salt, for example sodium chloride or potassium chloride or by evaporating the reaction solution, for example by spray drying, possibly after a buffer substance and/or a solubilizer has been added to said reaction solution. The novel compounds (1) have fiber-reactive properties and very good dye properties. They can therefore be used for dyeing hydroxy- and/or carboxamido-containing material, for example in the form of sheetlike structures, such as films and paper, or even leather, or in the mass, such as polyamide and polyurethane, but in particular materials in fiber form. Similarly, the solutions obtained in the course of the synthesis of the compounds according to the invention, if desired after addition of a buffer substance and/or a solubilizer and if desired after concentrating of the solution, can be used directly as a liquid formulation for dyeing.

The present invention therefore also relates to the use of the compounds according to the invention of the general formula (1) for dyeing (including mass coloration and printing) these materials, i.e. to process for dyeing such materials in a conventional manner using a compound of the general formula (1) as colorant. Preferably, the materials are employed in the form of fiber materials, in particular in the form of textile fibers.

Hydroxy-containing materials are natural or synthetic hydroxy-containing materials, such as, for example, cellulose fiber materials or their regeneration products and polyvinyl alcohols. Cellulose fiber materials are preferably cotton, but also other vegetable fibers, such as linen, hemp, jute and ramie fibers; regenerated cellulose fibers are for example staple viscose and filament viscose.

Carboxamido-containing materials are for example synthetic or natural polyamides and polyurethanes, in particular in the form of fibers, for example wool and other animal hairs, silk, leather, nylon-6.6, nylon-6, nylon-11 and nylon-4.

The compounds according to the invention of the formula (1) can be applied to and fixed on the substrates mentioned, in particular on the fiber materials mentioned, by the application techniques known for water-soluble dyes, in particular for fiber-reactive dyes.

For instance, applied to cellulose fibers from a long liquor by the exhaust method using a very wide range of acid-binding agents in the absence or presence of neutral salts, such as, for example, sodium chloride or sodium sulfate, they produce good color yields. Dyeing is carried out at temperatures between 60° and 100° C., if desired under pressure at temperatures of up to 120° C., in the presence or absence of customary dyeing assistants, in an aqueous bath. A possible dyeing procedure comprises entering the warm bath with the material and gradually raising the temperature to the desired dyeing temperature and completing the dyeing process at that temperature. The neutral salts which accelerate the exhaustion of the dye can if desired also be added to the bath after the actual dyeing temperature has been reached.

Padding likewise produces excellent color yields on cellulose fibers, and the dyes can be fixed in a conventional manner by leaving to stand at room temperature or elevated temperature, for example at up to 60° C., by steaming or by means of dry heat.

Similarly, by employing conventional printing processes for cellulose fibers, which can be carried out as one-step processes, for example in the presence of sodium bicarbonate or other acid-binding agents in the print paste containing the compound of the formula (1) and subsequent steaming of the printed material at 101° to 103° C., or as two-step processes, for example by printing with a neutral or weakly acid print paste containing the compound of the formula (1) and fixing by passing through a hot electrolyte-containing alkaline bath or by overpadding with an alkaline electrolyte-containing padding liquor and subsequent batching of this treated material or subsequent steaming or subsequent treatment with dry heat, it is possible to obtain strong prints having well-defined contours and a clear white ground. The outcome of the prints varies only little with varying fixing conditions. The degree of fixation obtained with the compounds according to the invention are very high both in dyeing and in printing.

Fixing by means of dry heat as per the customary thermofixing processes is carried out using hot air at 120° to 200° C. Aside from customary steam at 101° to 103° C., it is also possible to use superheated steam and high-pressure steam at temperatures of up to 160° C.

The acid-binding agents which cause the dyes to become fixed on the cellulose fiber are for example water-soluble basic salts of the alkali metals or alkaline earth metals of inorganic or organic acids or compounds which liberate alkali on heating, and in particular the alkali metal hydroxides and alkali metal salts of weak to medium inorganic or organic acids, alkali metal compounds referring here in particular to the sodium and potassium compounds. Such acid-binding agents are for example sodium hydroxide, potassium hydroxide, sodium carbonate, sodium bicarbonate, potassium carbonate, sodium formate, sodium dihydrogenphosphate, disodium hydrogenphosphate, sodium trichloroacetate, waterglass and trisodium phosphate.

By treating the compounds according to the invention with acid-binding agents, if desired with heating, the compounds according to the invention (dyes) are bonded chemically to the cellulose fiber; after the customary aftertreatment by rinsing to remove unfixed dye portions, the dyeings on cellulose show excellent wet fastness properties.

As regards the coloristic behavior of the compounds according to the invention, it is particularly noteworthy that they are distinguished by good stability in print pastes and padding liquors, even in the presence of alkali, by very good exhaustability from long liquors, by good color buildup in the customary dyeing and printing processes, by a uniform depth of shade on dyeing cotton and regenerated cellulose fibers, by a level appearance of the dyeings and prints prepared therewith and likewise by a uniform outcome of the dyeings from a long liquor in the presence of varying amounts of electrolytes.

The dyeings on polyurethane and polyamide fibers are customarily carried out in an acid medium. For instance, acetic acid and/or ammonium sulfate and/or acetic acid and ammonium acetate or sodium acetate can be added to the dyebath to obtain the desired pH. To obtain a dyeing of usable levelness, it is advisable to add customary leveling assistants, such as, for example, those based on a reaction product of cyanuric chloride with three times the molar amount of aminobenzenesulfonic acid and/or an aminonaphthalenesulfonic acid or based on a reaction product of for example stearylamine with ethylene oxide. In general, the material to be dyed is introduced into the initially weakly alkaline bath at a temperature of about 40° C. and agitated therein for some time, the dyebath is then brought to the desired weakly acid, preferably weakly acetic acid, pH, and the actual dyeing is carried out at a temperature between 60° and 98° C. However, the dyeings can also be carried out at the boil or at temperatures of up to 120° C. (under superatmospheric pressure).

The dyeings and prints produced with the compounds according to the invention are distinguished by pure, predominantly blue, hues. The dyeings and prints on cellulose fiber materials in particular have a high tinctorial strength and good to very good performance and fabrication fastness properties, such as a very good light, perspiration light, wet light and crock fastness and excellent wet fastness properties, such as wash, chlorinated water, chlorine bleach, seawater, fulling, alkali, acid fading, peroxide and perspiration fastness, and also a good hot-press and good drycleaning fastness and good stability of the complex to iron. Unfixed dye portions can easily be washed completely off again from the fiber material, which is an essential prerequisite for the good wetfast properties of the obtainable dyeings. Furthermore, the dyeings are stable to the customary synthetic resin finishes. The compounds according to the invention (dyes) partly match the customary anthraquinone standard in respect of purity of hue and in addition have the advantage of very much easier dischargability over said anthraquinone dyes.

The Examples which follow serve to illustrate the invention. The compounds described in terms of a formula are written in the form of the free acids. In general, they are prepared and isolated in the form of their sodium or potassium salts and used for dyeing in the form of their salts. Similarly, the starting compounds mentioned in the Examples which follow, in particular the Table Examples, in the form of the free acid can be used in the synthesis as such or in the form of their salts, preferably alkali metal salts, such as sodium or potassium salts.

The parts and percentages mentioned in the Examples are by weight, unless otherwise stated. Parts by weight relate to parts by volume as the kilogram relates to the liter.

The $\lambda_{max}$ values indicated in the Examples for the copper complex formazan compounds according to the invention represent the absorption maxima in the visible region, measured in aqueous solutions of the alkali metal salts of the compounds (1) according to the invention.

sodium carbonate. The reaction batch is subsequently stirred at 15° to 25° C. until no more diazonium compound is detectable.

(b) In the copper complex formazan compound synthesized under (a) the acetylamino group is hydrolyzed to an amino group directly in the synthesis solution after addition of 6 to 10 times the molar amount of a concentrated aqueous sodium hydroxide solution at a temperature between 90° and 100° C. in the course of about 10 hours (the acetylamino copper formazan compound can also be salted out beforehand from the synthesis solution by means of sodium chloride and isolated and then be hydrolyzed in approximately 3% strength aqueous sodium hydroxide solution). The amino-containing copper formazan compound obtained can be isolated by salting out with sodium chloride after the pH has been brought back to a value of about 4.

(c) The preferred starting point for the further reaction of the amino copper complex formazan compound is the synthesis solution of (b), which is at pH 4, by reacting the solution with thorough stirring at a temperature of 0° to 5° C. and at a pH between 3 and 4, which is maintained by means of an aqueous sodium carbonate solution, with 16.6 parts of cyanuric chloride to give the 2,4-dichloro-s-triazin-6-ylamino copper complex formazan compound in the course of 3 to 4 hours.

(d) To the synthesis solution of (c) is added an aqueous solution of the sodium salt of 40 parts of 3-(β-sulfatoethylsulfonyl)-4-N-(β-sulfatoethyl)-aminoaniline, the temperature is raised to 30° to 40° C. and a pH of 4 to 5 is maintained by means of an aqueous sodium carbonate solution until the reaction has ended. The synthesis solution obtained is then clarified at 40° to 50° C., and the synthesized compound according to the invention is isolated from the filtrate by addition of sodium chloride or potassium chloride or—if desired after prior treatment with oxalic acid—by evaporation or spraydrying.

The alkali metal salt (sodium or potassium salt) of the compound of the formula

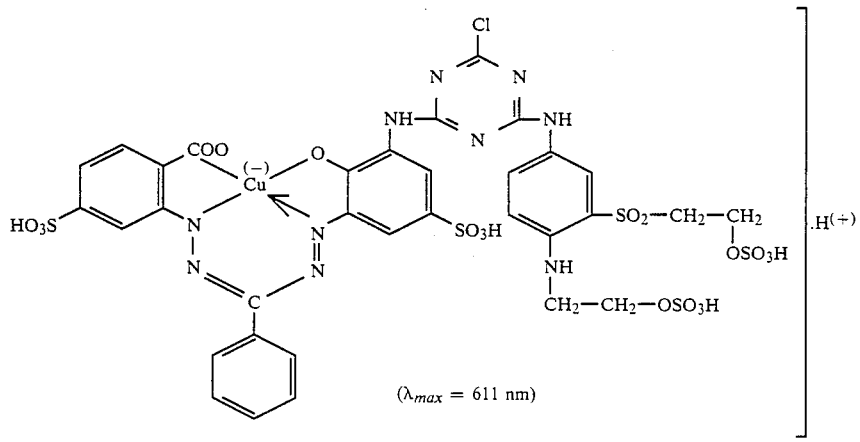

($\lambda_{max}$ = 611 nm)

EXAMPLE 1

(a) An aqueous, neutral solution of the sodium salt of 32.0 parts of the hydrazone of 2-carboxy-5-sulfophenylhydrazine and benzaldehyde in about 160 parts of water is combined with stirring at 5° to 15° C. with an aqueous solution, obtained by customary diazotization, of the diazonium salt of 24.6 parts of 6-acetylamino-4-sulfo-2-aminophenol; 25.0 parts of copper sulfate pentahydrate are then added, and a pH of 5 is maintained by means of is obtained as a dark powder which contains the electrolyte salt. The compound according to the invention shows very good dye properties and dyes the materials mentioned in the description in blue shades having a slightly reddish tinge. Cellulose fiber materials in particular, such as cotton and also regenerated cellulose fiber materials, are dyed in deep shades if the dye is applied by the application and fixing methods customary in industry for fiber-reactive dyes, for example from an aqueous, long liquor at 70° C. in the presence of an acid-binding agent. After the customary aftertreatment, for example by 10 minutes soaping off and rinsing with water, the dyeings obtained according to the invention are distinguished by very good lightfastness properties in the dry state and also after moistening with tapwater or an alkaline or acid perspiration solution, and further by excellent wetfastness properties, such as wash, chlorinated water, chlorine bleach, alkali, perspiration and peroxide fastness properties. Furthermore, they show good acid fading resistance.

triazinylamino compound with the amino group of the copper complex formazan compound has ended.

The compound according to the invention thus obtained is identical to that of Example 1 and has the good fiberreactive dye properties described therein.

EXAMPLES 3a to 7h

In the Table Examples which follow, further copper complex formazan compounds according to the invention are described with the aid of the general formula (A)

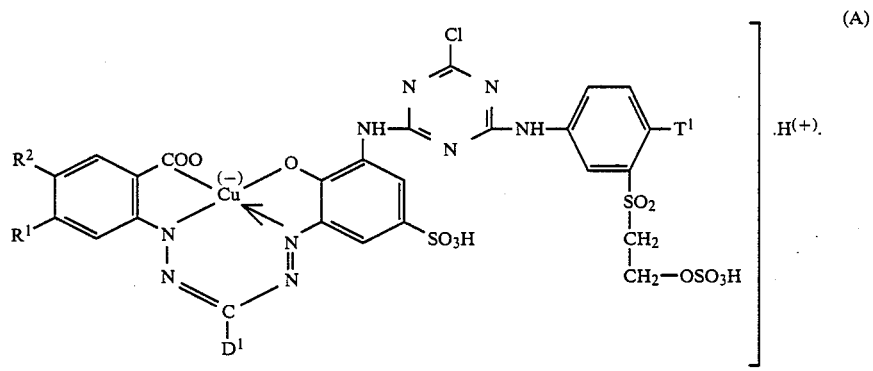

EXAMPLE 2

(a) 18.4 parts of cyanuric chloride are suspended in the presence or absence of an nonionic assistant in a mixture of 50 parts of water and 50 parts of ice, an aqueous solution of the sodium salt of 42.0 parts of 3-(β-sulfatoethylsulfonyl)-4-N-(β-sulfatoethyl)-amino-aniline is then added while a temperature of 0° to 5° C. and pH of about 2 are maintained in the course of one hour and the mixture is stirred for some time thereafter until no more free cyanuric chloride is detectable.

(b) To the solution of the monocondensation product obtained according to (a) from cyanuric chloride and the aniline compound and clarified if necessary is added an aqueous suspension of the amino copper complex formazan compound, prepared as in Example 1(a) to (c) and brought to pH 5, and the batch is raised to 30° to 40° C. and maintained at that temperature at a pH of 5 to 6 by means of an aqueous 10% strength sodium carbonate solution until the condensation reaction of the dichloro- They can be prepared in a manner according to the invention, for example analogously to working Examples 1 and 2, with the aid of the components evident from the formula (A) and the respective Table Example (cyanuric chloride, 2-carboxy-5-sulfophenylhydrazine or -4-sulfophenylhydrazine, the benzaldehyde conforming to a general formula $D^1$-CHO, the aminophenol indicated in Example 1 and an aniline compound conforming to the general formula (3a)

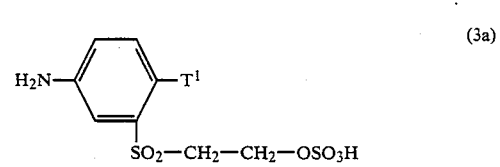

where $T^1$ has the meaning indicated in the respective Table Example). They likewise have very good fiber-reactive dye properties and applied by the dyeing and printing methods customary for fiber-reactive dyes produce in particular on cellulose fiber materials deep fast dyeings and prints having the shade on cotton indicated in the respective Table Example.

| | Compounds conforming to the formula (A) | | | | Hue |
|---|---|---|---|---|---|
| Example | $R^1$ | $R^2$ | Radical $D^1$ | Amino radical $T^1$ | ($\lambda_{max}$) |
| 3a | sulfo | H | phenyl | N—methyl-N—(β-sulfatoethyl)-amino | blue (611) |
| 3b | sulfo | H | phenyl | N—(γ-sulfato-n-propyl)-amino | blue (611) |
| 3c | sulfo | H | phenyl | N—(β-sulfato-n-propyl)-amino | blue (611) |
| 3d | sulfo | H | phenyl | N—[(β-sulfato-α-methyl)-ethyl]-amino | blue |
| 3e | sulfo | H | phenyl | N—[(β-sulfato-α-ethyl)-ethyl]-amino | blue |
| 3f | sulfo | H | phenyl | N—(δ-sulfato-n-butyl)-amino | blue |
| 3g | sulfo | H | phenyl | N—(β-sulfoethyl)- | blue |

-continued

| Example | R¹ | R² | Radical D¹ | Amino radical T¹ | Hue ($\lambda_{max}$) |
|---|---|---|---|---|---|
| 3h | sulfo | H | phenyl | N—methyl-N—(β-sulfo-ethyl)-amino | blue (611) |
| 3j | sulfo | H | phenyl | N—[β-(β'-sulfato-ethoxy)-ethyl]-amino | blue |
| 3k | sulfo | H | phenyl | N—[β-(β'-sulfato-ethylamino)-ethyl]-amino | blue |
| 3m | sulfo | H | phenyl | N—{β-[N'—methyl-N'—(β'-sulfatoethyl)-amino]-ethyl}-amino | blue |
| 3n | sulfo | H | phenyl | N—(carboxymethyl)-amino | blue |
| 3p | sulfo | H | phenyl | N—[β-(β'-carboxy-ethyl)-carboxamido]-ethyl-amino | blue (611) |
| 3q | sulfo | H | phenyl | β-sulfatoethyl-thio | blue (611) |
| 4a | sulfo | H | 4-chloro-phenyl | N—(β-sulfatoethyl)-amino | blue (611) |
| 4b | sulfo | H | 4-methyl-phenyl | N—(βsulfatoethyl)-amino | blue |
| 4c | sulfo | H | 3-methoxy-phenyl | N—(β-sulfatoethyl)-amino | blue |
| 4d | sulfo | H | 4-methoxy-phenyl | N—(β-sulfatoethyl)-amino | greenish blue |
| 4e | sulfo | H | 4-sulfo-phenyl | N—(β-sulfatoethyl)-amino | blue |
| 4f | sulfo | H | 3-sulfo-phenyl | N—(β-sulfatoethyl)-amino | blue |
| 4g | sulfo | H | 2-chloro-5-sulfophenyl | N—(β-sulfatoethyl)-amino | reddish blue |
| 5a | H | sulfo | phenyl | N—(β-sulfatoethyl)-amino | blue (617) |
| 5b | H | sulfo | phenyl | N—methyl-N—(β-sulfatoethyl)-amino | blue (617) |
| 5c | H | sulfo | phenyl | N—(γ-sulfato-n-propyl)-amino | blue (617) |
| 5d | H | sulfo | phenyl | N—(β-sulfato-n-propyl)-amino | blue |
| 5e | H | sulfo | phenyl | N—[(β-sulfato-α-methyl)-ethyl]-amino | blue |
| 5f | H | sulfo | phenyl | N—[(β-sulfato-α-ethyl)-ethyl]-amino | blue |
| 5g | H | sulfo | phenyl | N—(δ-sulfato-n-butyl)-amino | blue |
| 5h | H | sulfo | phenyl | N—(β-sulfoethyl)-amino | blue (617) |
| 5j | H | sulfo | phenyl | N—methyl-N—(β-sulfo-ethyl)-amino | blue |
| 5k | H | sulfo | phenyl | N—[β-(β'-sulfato-ethoxy)-ethyl]-amino | blue |
| 5m | H | sulfo | phenyl | N—[β-(β'—sulfato-ethylamino)-ethyl]-amino | blue |
| 5n | H | sulfo | phenyl | N—{β-N'—methyl-N'—(β'-sulfatoethyl)-amino]-ethyl}-amino | blue |
| 5q | H | sulfo | phenyl | N—(carboxymethyl)-amino | blue |
| 5r | H | sulfo | phenyl | N—[β-(β'-carboxy-ethyl)-carboxamido]-ethyl-amino | blue (617) |
| 5s | H | sulfo | phenyl | β-sulfatoethyl-thio | blue (617) |
| 6a | H | sulfo | 4-chloro-phenyl | N—(β-sulfato-ethyl)-amino | blue |
| 6b | H | sulfo | 4-methyl-phenyl | N—(β-sulfato-ethyl)-amino | blue |
| 6c | H | sulfo | 3-methoxy-phenyl | N—(β-sulfato-ethyl)-amino | blue |
| 6d | H | sulfo | 4-methoxy-phenyl | N—(β-sulfato-ethyl)-amino | greenish blue |
| 6e | H | sulfo | 4-sulfo-phenyl | N—(β-sulfato-ethyl)-amino | blue |
| 6f | H | sulfo | 3-sulfo-phenyl | N—(β-sulfato-ethyl)-amino | blue |
| 6g | H | sulfo | 2-chloro-5-sulfophenyl | N—(β-sulfato-ethyl)-amino | reddish-blue |
| 7a | sulfo | H | 4-chloro- | N—methyl-N—(β- | blue |

-continued

| Example | R¹ | R² | Radical D¹ | Amino radical T¹ | Hue ($\lambda_{max}$) |
|---|---|---|---|---|---|
| 7b | H | sulfo | 4-chloro-phenyl | sulfatoethyl)-amino N—methyl-N—($\beta$-sulfatoethyl)-amino | blue |
| 7c | H | sulfo | 4-methyl-phenyl | N—methyl-N—($\beta$-sulfatoethyl)-amino | blue |
| 7d | sulfo | H | 4-methyl-phenyl | N—methyl-N—($\beta$-sulfatoethyl)-amino | blue |
| 7e | H | sulfo | 4-methyl-phenyl | N—($\gamma$-sulfato-n-propyl)-amino | blue |
| 7f | sulfo | H | 4-methyl-phenyl | N—($\gamma$-sulfato-n-propyl)-amino | blue |
| 7g | H | sulfo | 4-chloro-phenyl | N—($\gamma$-sulfato-n-propyl)-amino | blue |
| 7h | sulfo | H | 4-chloro-phenyl | N—($\gamma$-sulfato-n-propyl)-amino | blue |

EXAMPLE 8

Similarly technically useful copper complex formazan compounds according to the invention which have good fiber-reactive dye properties are obtained on replacing the benzaldehyde components in Examples 3c to 3n by another benzaldehyde component as per Examples 4d to 4g.

EXAMPLE 9

Similarly technically useful copper complex formazan compounds according to the invention which have good fiber-reactive dye properties are obtained on replacing the amino component T¹ in Examples 4a to 4g by another amino component as per Examples 3c to 3n.

EXAMPLE 10

To prepare a copper complex formazan compound according to the invention, the procedure of Example 1 or of Example 2 is followed, except that to prepare the amino copper complex formazan starting compound as per Example 1(c) the starting phenylhydrazine of 2-carboxy-5-sulfophenylhydrazine and benzaldehyde which is mentioned in Example 1(a) is replaced by an equivalent amount of the phenylhydrazone from 2-hydroxy-5-sulfophenylhydrazine and benzaldehyde. The compound according to the invention can be isolated by following the directions of Example 1. Written in the form of the free acid, said compound has the formula

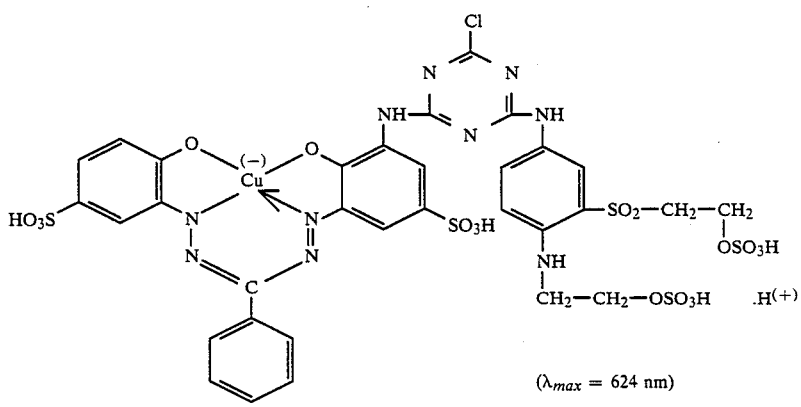

($\lambda_{max}$ = 624 nm)

and shows very good fiber-reactive dye properties.

On cellulose fiber materials in particular it produces, if applied by the dyeing and printing methods customary for fiber-reactive dyes, deep, blue dyeings and prints having good fastness properties.

EXAMPLE 11

To prepare a copper complex formazan compound according to the invention, Example 10 is repeated, except that in the process step corresponding to Example 1(d) or 2(a) the aniline compound used therein is replaced by an equivalent amount of 3-($\beta$-sulfatoethylsulfonyl)-4-[N-methyl-N-($\beta$-sulfatoethyl)]-aminoaniline.

The compound according to the invention, written in the form of the free acid, has the formula

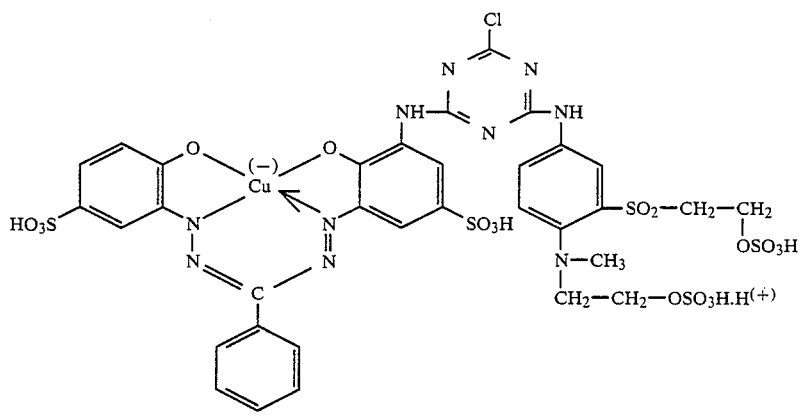

($\lambda_{max}$ = 624 nm)

and likewise shows very good fiber-reactive dye properties. On cellulose fiber materials in particular it produces deep, blue dyeings and prints having good fastness properties.

EXAMPLE 12

(a) An aqueous, neutral solution of the sodium salt of 37.7 parts of the hydrazone of 2-carboxy-4-acetylaminophenylhydrazine and 2-sulfo-benzaldehyde in about 200 parts of water is combined with stirring at 5° to 15° C. with an aqueous solution, obtained by customary diazotization, of the diazonium salt of 18.9 parts of 4-sulfo-2-aminophenyl; 25.0 parts of copper sulfate pentahydrate are then added, and a pH of 5 is maintained by means of sodium carbonate. The reaction batch is subsequently stirred at 15° to 25° C. until no more diazonium compound is detectable.

(b) In the copper complex formazan compound synthesized under (a) the acetylamino group is hydrolyzed to an amino group directly in the synthesis solution after addition of 6 to 10 times the molar amount of a concentrated aqueous sodium hydroxide solution at a temperature between 90° and 100° C. in the course of about 10 hours (the acetylamino copper formazan compound can also be salted out beforehand from the synthesis solution by means of sodium chloride and isolated and then be hydrolyzed in approximately 3% strength aqueous sodium hydroxide solution). The amino-containing copper formazan compound obtained can be isolated by salting out with sodium chloride after the pH has been brought back to a value of about 4.

(c) The preferred starting point for the further reaction of the amino copper complex formazan compound is the synthesis solution of (b), which is at pH 4, by reacting the solution with thorough stirring at a temperature of 0° to 5° C. and at a pH between 3 and 4, which is maintained by means of an aqueous sodium carbonate solution, with 16.6 parts of cyanuric chloride to give the 2,4-dichloro-s-triazin-6-ylamino copper complex formazan compound in the course of 3 to 4 hours.

(d) To the synthesis solution of (c) is added an aqueous solution of the sodium salt of 40 parts of 3-($\beta$-sulfatoethylsulfonyl)-4-N-($\beta$-sulfatoethyl)-aminoaniline, the temperature is raised to 30° to 40° C. and a pH of 4 to 5 is maintained by means of an aqueous sodium carbonate solution until the reaction has ended. The synthesis solution obtained is then clarified at 40° to 50° C., and the synthesized compound according to the invention is isolated from the filtrate by addition of sodium chloride or potassium chloride or—if desired after prior treatment with oxalic acid—by evaporation or spray-drying.

The alkali metal salt (sodium or potassium salt) of the compound of the formula

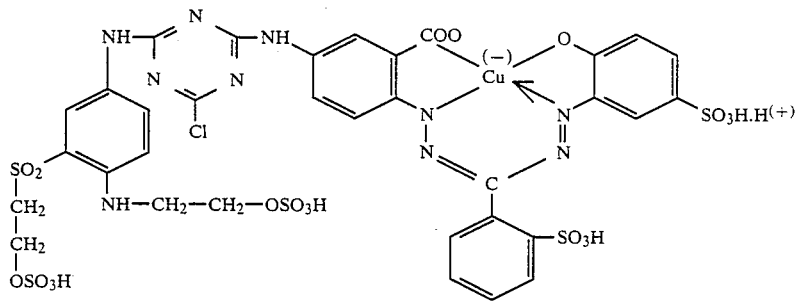

($\lambda_{max}$ = 603 nm)

is obtained as a dark powder containing electrolyte salt. The compound according to the invention shows very good dye properties and dyes the materials mentioned in the description in blue shades having a slightly reddish tinge. Cellulose fiber materials in particular, such as cotton and also regenerated cellulose fiber materials, are dyed in deep shades if the dye is applied by the application and fixing methods customary in industry for fiber-reactive dyes, for example in the short-time padbatch method at 70° C. in the presence of an acid-binding agent. After the customary aftertreatment, for example by 10 minutes soaping off and rinsing with water, the dyeings obtained according to the invention are distinguished by very good lightfastness properties in the dry state and also after moistening with tapwater or an alkaline or acid perspiration solution, and further by excellent wetfastness properties, such as wash, chlorinated water, chlorine bleach, alkali, perspiration and peroxide fastness properties. Furthermore, they show good acid fading resistance.

EXAMPLE 13

(a) 18.4 parts of cyanuric chloride are suspended in the presence or absence of an nonionic assistant in a mixture of 50 parts of water and 50 parts of ice; an aqueous solution of the sodium salt of 42.0 parts of 3-($\beta$-sulfatoethylsulfonyl)-4-N-($\beta$-sulfatoethyl)-aminoaniline is then added while a temperature of 0° to 5° C. and pH of about 2 are maintained in the course of one hour and is stirred for some time thereafter until no free cyanuric chloride is detectable any longer.

(b) To the solution of the monocondensation product obtained according to (a) from cyanuric chloride and the aniline compound and clarified if necessary is added an aqueous suspension of the amino copper complex formazan compound, prepared as in Example 1(a) to (c) and brought to pH 5, and the batch is heated to 30° to 40° C. and maintained at that temperature at a pH of 5 to 6 by means of aqueous 10% strength sodium carbonate solution until the condensation reaction of the dichlorotriazinylamino compound with the amino group of the copper complex formazan compound has ended.

The compound according to the invention thus obtained is identical to that of Example 12 and has the good fiber-reactive dye properties described therein.

EXAMPLE 14

To prepare a copper complex formazan compound according to the invention, the procedure of Example 12 or 13 is followed, except that, to prepare the amino copper complex formazan starting compound as per Example 12(c), the diazo component 2-aminophenol-4-sulfonic acid used in Example 12(a) is replaced by an equivalent amount of 2-aminophenol-4,6-disulfonic acid. The compound according to the invention can be isolated by following the directions of Example 12. It shows very good fiber-reactive dye properties ($\lambda_{max}$=605 nm) and applied by the dyeing and printing methods customary for fiber-reactive dyes, for example a short-time pad-batch method, produces in particular on cellulose fiber materials deep, blue dyeings and prints having the properties indicated for the compound according to the invention of Example 12.

EXAMPLE 15

To a solution of 64 parts of the sodium salt of the amino copper complex formazan compound of Example 1(c) in 600 parts of water are gradually added at 0° C. with thorough stirring 13.5 parts of cyanuric fluoride, while a pH of 6 is maintained with 10% strength aqueous sodium carbonate solution. After the condensation reaction has ended, an aqueous solution of the sodium salt of 42.0 parts of 3-($\beta$-sulfatoethylsulfonyl)-4-($\beta$-sulfatoethyl)-aminoaniline is added, and stirring is continued while a pH between 5 and 6 and a temperature of 20° C. is maintained until the second condensation reaction has ended. The compound according to the invention is then isolated by salting out with sodium chloride or potassium chloride and filtration, washed with an approximately 10% strength aqueous solution of sodium chloride or potassium chloride and dried at 40° C. under reduced pressure.

The alkali metal salt (sodium or potassium salt) of the compound of the formula

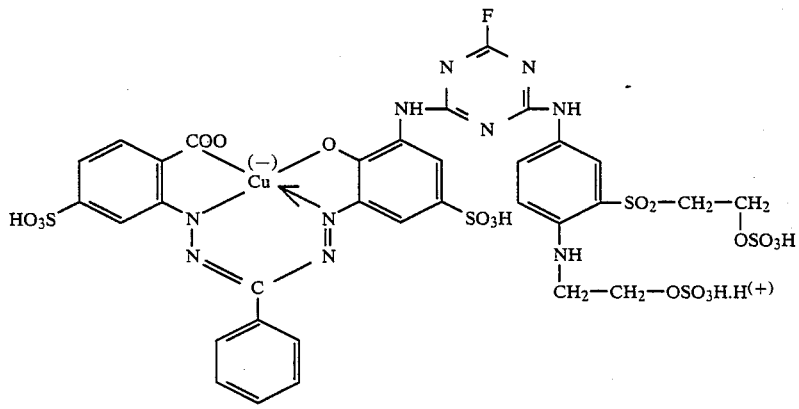

($\lambda_{max}$ = 610 nm)

is obtained as a dark powder which contains electrolyte salt. The compound according to the invention shows very good dye properties and dyes the materials mentioned in the description in blue shades having a slightly reddish tinge. Cellulose fiber materials in particular, such as cotton and also regenerated cellulose fiber materials, are dyed in deep blue shades by the application and fixing methods customary in industry for fiber-reactive dyes, for example from an aqueous, long liquor at 60° C. in the presence of an acid-binding agent. The dyeings and prints obtained according to the invention are distinguished by very good light fastness properties in the dry state and also when moistened with tapwater or an alkaline or acid perspiration solution, and further by excellent wetfast properties, such as wash, chlorinated water, chlorine bleach, alkali, perspiration, and peroxide fastnesses. They further show good acid fading resistance.

EXAMPLE 16a

To prepare a copper complex formazan compound according to the invention, the procedure of Example 15 is followed except that the 3-($\beta$-sulfatoethylsulfonyl)-4-($\beta$-sulfatoethyl)-aminoaniline used therein is replaced by an equivalent amount of 3-(β-sulfatoethyl-sulfonyl)-4-[N-methyl-N-(β-sulfatoethyl)]-aminoaniline. This fluorotriazine compound according to the invention likewise has very good fiber-reactive dye properties and applied by the application method customary for fiber-reactive dyes produces in particular on cellulose fiber materials deep, blue, fast dyeings and prints. In aqueous solution it has an absorption maximum at 609 nm.

EXAMPLE 16b

To prepare a copper complex formazan compound according to the invention, the procedure of Example 15 is followed, except that the 3-(β-sulfatoethylsulfonyl)-4-(β-sulfatoethyl)-aminoaniline used therein is replaced by an equivalent amount of 3-(β-sulfatoethylsulfonyl)-4-N-[β-(β'-carboxyethylcarboxamido)-ethyl]-aminoaniline. This fluorotriazine compound according to the invention likewise has very good fiber-reactive dye properties and applied by the application methods customary for fiber-reactive dyes produces in particular on cellulose fiber materials deep, blue, fast dyeings and prints. In aqueous solution it has an absorption maximum at 610 nm.

EXAMPLE 16c

To prepare a copper complex formazan compound according to the invention, the procedure of Example 15 is followed, except that the 3-(β-sulfatoethylsulfonyl)-4-(β-sulfatoethyl)-aminoaniline used therein is replaced by an equivalent amount of one of the aniline compounds of the general formula (3a) described in Examples 3a to 3q. These fluorotriazine compounds according to the invention likewise have very good fiber-reactive dye properties and applied by the dyeing and printing methods customary for fiber-reactive dyes produce in particular on cellulose fiber materials deep, blue, fast dyeings and prints.

APPLICATION EXAMPLE 1

1,900 parts by volume of an aqueous dyebath which contains 2 parts of the copper complex formazan compound according to the invention described in Example 1 and 100 parts of sodium chloride, in solution, are entered at 25° C. with 100 parts of a cotton fabric, the dyeing temperature is raised to 60° C. in the course of 20 minutes, dyeing is continued at that temperature for 15 more minutes, 100 parts of an aqueous sodium carbonate solution (taken from a solution of 200 parts of calcinated sodium carbonate in 1,000 parts of water) are then added, the dyeing is continued at 60° C. for a further 45 minutes, and the dyed cotton fabric is then removed and after-treated in a conventional manner by first rinsing with water, then neutralizing at 40° C. for 15 minutes in a solution containing a little acetic acid, rinsing once more with water, treating at the boil for 15 minutes in a bath which contains a nonionic detergent, rinsing once more with water and drying.

The result obtained is a reddish blue dyeing having the good to very good fastness properties mentioned in Example 1.

APPLICATION EXAMPLE 2

An equally good, deep and fast dyeing as in Application Example 1 is obtained when the sodium chloride in the dyebath described in Application Example 1 is replaced by an equivalent amount of anhydrous sodium sulfate and the dyeing is carried out at 70° C.

APPLICATION EXAMPLE 3

A dyeing liquor is prepared by dissolving 3 parts of the copper complex formazan compound according to the invention described in Example 1 in 50 parts of water and adding 50 parts an aqueous 1% sodium hydroxide solution.

A cotton fabric is padded with this dye liquor in a liquor pickup of 70% on weight of fiber, wound onto a batching roller, wrapped in a plastic sheet and stored at 20° C. for 8 hours. Thereafter the dyed fabric is aftertreated as described in Example 1. The result obtained is a deep reddish blue dyeing having the good fastness properties described in Example 1.

APPLICATION EXAMPLE 4

A dyeing liquor is prepared by dissolving 2 parts of the copper complex formazan compound according to the invention described in Example 1 in 50 parts of water and adding 50 parts of an alkaline aqueous solution containing per liter 16 g of sodium hydroxide, 200 ml of an aqueous 38° Be waterglass solution and 200 g of urea. A cotton fabric is padded with this dye liquor to a liquor pickup of 70% on weight of fiber, wound onto a batching roller, wrapped in a plastic sheet and stored at 20° C. for 12 to 24 hours. Thereafter the dyed fabric is aftertreated as described in Example 1. The result obtained is a deep reddish blue dyeing having the good fastness properties described in Example 1.

APPLICATION EXAMPLE 5

To a solution of 4 parts of the copper complex formazan compound according to the invention described in Example 1 in 50 parts of water are added 50 parts of an alkaline aqueous solution containing per liter 40 g of sodium carbonate and 200 g of urea. A cotton fabric is padded with this dyeing liquor to a liquor pickup of 75% on weight of fiber, dried at 60° C. and then thermally fixed at 140° C. for 60 to 120 seconds. The dyed fabric is after-treated as described in Example 1. The result obtained is a reddish blue dyeing having the good fastness properties described in Example 1.

APPLICATION EXAMPLE 6

A cotton fabric is impregnated to a liquor pickup of 75% on weight of fiber with an aqueous dyeing liquor comprising 4 parts of the copper complex formazan compound according to the invention described in Example 1 and 0.5 part of sodium m-nitrobenzenesulfonate in 100 parts of water. The impregnated fabric is dried at 60° C. and then overpadded at 20° C. to a liquor pickup of 75% on weight of fiber with an alkaline aqueous solution containing per liter 7 g of sodium hydroxide and 250 g of sodium chloride. The overpadded fabric is then steamed at 100° to 102° C. for 30 to 60 seconds and subsequently aftertreated in a conventional manner, for example as described in Example 1. The result obtained is a reddish blue dyeing having the good fastness properties mentioned in Example 1.

APPLICATION EXAMPLE 7

To an aqueous solution of 6 parts of the copper complex formazan compound according to the invention described in Example 1 in 50 parts of water are added 50 parts of an alkaline aqueous solution containing per liter 40 g of sodium carbonate and 200 g of urea. A cotton fabric is padded with this dyeing liquor to a liquor pickup of 70% on weight of fiber, and the padded fabric is dried, for example in dry heat at 100° C. for 90 seconds, and then steamed with saturated steam at 102° C. for 30 to 60 seconds. The dyeing is aftertreated in a conventional manner, for example as described in Example 1. The result obtained is a reddish blue dyeing having the good fastness properties mentioned in Example 1.

APPLICATION EXAMPLE 8

An aqueous print paste is prepared from 100 parts of an aqueous stock thickening which contains 50 parts of a 5% strength aqueous neutral sodium alginate thickening, 10 parts of urea, 1 part of sodium m-nitrobenzenesulfonate and 2.5 parts of sodium hydrogencarbonate, as well as water, and 2 parts of the copper complex formazan compound according to the invention described in Example 1. A cotton fabric is printed with this print paste, dried at 60° C., steamed with saturated steam at 102° C. for 8 minutes and then aftertreated in a conventional manner, for example as described in Example 1. The result obtained is a deep, reddish blue print having the good fastness properties described in Example 1.

We claim:
1. A copper complex formazan compound which conforms to the formula

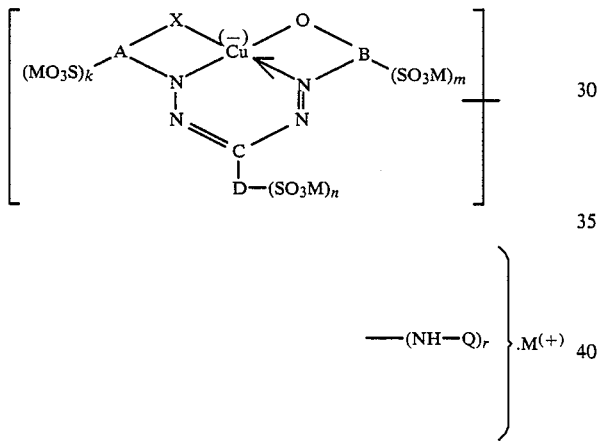

in which
M is hydrogen or an alkali metal,
k is the number zero, 1 or 2,
m is the number zero, 1 or 2, and
n is the number zero, 1 or 2,
the sum if (k+m+n) being equal to an integer from 1 to 4,
A is a benzene ring or a naphthalene ring, wherein each is unsubstituted or substituted, aside from $(MO_3S)_k$, by the indicated fiber-reactive group -NH-Q defined hereinafter or by 1 or 2 substituents selected from the group consisting of halogen, nitro, carboxy, alkyl of 1 to 4 carbon atoms, sulfamoyl, N-($C_1$-$C_4$)-alkylsulfamoyl, N,N-di-[($C_1$-$C_4$)-alkyl]-sulfamoyl, ($C_1$-$C_4$)-alkylsulfonyl, phenysulfonyl, and an alkoxy of 1 to 4 carbon atoms, or is substituted by the group —NH—Q and by one or two of said substituents;
B is a benzene ring or a naphthalene ring, wherein each is unsubstituted or substituted, aside from $(SO_3M)_m$, by the indicated fiber-reactive group —NH—Q defined hereinafter or by 1 or 2 substituents selected from the group consisting of halogen, nitro, alkyl of 1 to 4 carbon atoms, alkoxy of 1 to 4 carbon atoms, sulfamoyl, N-($C_1$-$C_4$)-alkyl-sulfamoyl, N,N-di-[($C_1$-$C_4$)-alkyl]-sulfamoyl, ($C_1$-$C_4$)-alkylsulfonyl, and phenylsulfonyl, or is substituted by the group —NH—Q and by one or two of the said substituents;
D is an alkylene of 1 to 8 carbon atoms unsubstituted or substituted by phenyl, or is a benzene or naphthalene ring which is unsubstituted or, aside from $-(SO_3M)_n$, substituted by 1 or 2 substituents selected from the group consisting of halogen, alkyl of 1 to 4 carbon atoms, alkoxy of 1 to 4 carbon atoms, hydroxy, alkanoylamino of 2 to 5 carbon atoms, carboxy, and carbalkoxy of 2 to 5 carbon atoms, or by the group —NH—Q, or by that group and by 1 or 2 substituents mentioned above, or D is a heterocyclic radical selected from furan, thiophene, pyrrole, imidazole, pyrazole, pyridine, quinoline, and benzimidazole,
X is a group of the formula $-SO^3(-)$, the bonding to the copper atom and the negative charge thereof not being included, or is an oxy group —O— or a carbonyloxy group —CO—O—,
r is the number 1 or 2,
Q is a group of the formula

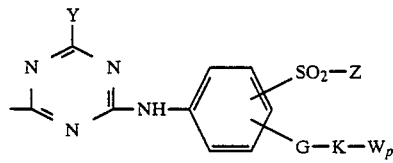

in which
Y is halogen,
Z denotes vinyl or $\beta$-phosphatoethyl, $\beta$-sulfatoethyl or $\beta$-thiosulfatoethyl,
G is the thio group —S— or an amino group of the formula —N(R)—,
in which
R stands for a hydrogen or an alkyl of 1 to 4 carbon atoms unsubstituted or substituted by 1 or 2 substituents selected from the group consisting of hydroxy, phenyl, sulfo, carboxy, sulfato, phosphato and alkanoyloxy of 2 to 5 carbon atoms, or is a group of the formula $-K-W_p$ defined hereinafter,
K is an alkylene or an arylene, arylen-alkylene or alkylene-arylene, where the arylene radicals are unsubstituted or substituted by 1 or 2 substituents selected from the group consisting of alkoxy of 1 to 4 carbon atoms, alkyl of 1 to 4 carbon atoms, halogen, sulfo and carboxy, and said alkylene groups are not interrupted or interrupted by 1, 2 or 3 hetero groups selected from —O—, —S—, —SO$_2$—, —CO—, —NH—CO—, —CO—NH—, —NH— and —N(R')— in which R' is hydrogen or alkanoyloxy of 2 to 5 carbon atoms or is alkyl of 1 to 4 carbon atoms unsubstituted or substituted by 1 or 2 substituents selected from hydroxy, sulfo, carboxy, sulfato, phosphato, phenyl and alkanoyloxy or 2 to 5 carbon atoms, and the alkylene-arylene and arylene-alkylene moieties are not interrupted or interrupted by a hetero group selected from —O—, —S—, —SO$_2$—, —CO—, —NH—CO—, —CO—NH—, —NH— and —N(R')— in which R' is defined as above,
W is a water-solubilizing group and
p stands for the number 1, 2 or 3, the fiber-reactive grouping —NH—Q is bonded to an aromatic carbon atom of a benzene or naphthalene ring of A or of B or of D or to an aliphatic carbon atom of D or of a substituent of A or B, except that in the case of r=2 the two —NH—Q groups are not bonded simultaneously to A or to B or to D.

2. A compound as claimed in claim 1, wherein:
the radical X and the nitrogen bonded to A are bonded to A in the ortho- position relative to each other, and
the oxygen and the nitrogen bonded to B are bonded to B in the ortho- position relative to each other.

3. A compound as claimed in claim 1, wherein D is a benzene or naphthalene ring which each, in addition to —(SO$_3$M)$_n$, is unsubstituted or substituted by 1 or 2 substituents selected from the group of substituents consisting of —NH—Q where Q has the meaning mentioned in claim 1, halogen, alkyl of 1 to 4 carbon atoms, alkoxy of 1 to 4 carbon atoms, nitro, hydroxy, carboxy and carbalkoxy of 2 to 5 carbon atoms.

4. A compound as claimed in claim 1, wherein r stands for the number 1.

5. A compound as claimed in claim 1, wherein the fiber-reactive grouping —NH—Q is bonded to an aromatic carbon atom of the benzene or naphthalene ring of A or of B.

6. A compound as claimed in claim 1, wherein A and B both represent a benzene ring having the indicated meanings.

7. A compound as claimed in claim 1, wherein the compound of the formula (1) is a compound of the formula

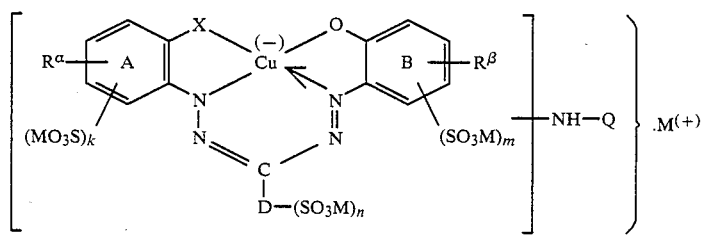

in which
R$^\alpha$ is a hydrogen or the indicated —NH—Q or a methyl, methoxy, ethoxy or nitro or a chlorine,
R$^\beta$ is a hydrogen or —NH—Q or a methyl, methoxy, ethoxy, ethylsulfonyl or nitro or a chlorine,
k is the number zero, 1 or 2,
m is the number zero, 1 or 2 and
n is the number zero, 1 or 2,
the sum of (k+m+n) being equal to 2 or 3,
M, D, Q and X have the meanings mentioned in claim 1,
the fiber-reactive grouping —NH—Q is bonded to the benzene ring A or to the benzene ring B or to an aromatic carbon atom of a benzene or naphthalene ring D.

8. A compound as claimed in claim 1, of the formula

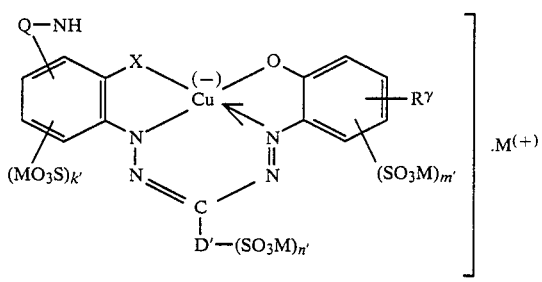

in which
k' is the number zero or 1,
m' is the number 1 or 2 and
n' is the number zero, 1 or 2,
the sum of (k'+m'+n') being equal to 2 or 3,
R$^\gamma$ is a methoxy, ethoxy, methyl or ethylsulfonyl or a chlorine or a hydrogen,
D' is a benzene ring which, in addition to the grouping —(SO$_3$M)$_{n'}$, is unsubstituted or substituted by a methoxy, ethoxy or methyl or a chlorine,
M, Q and X have the meanings mentioned in claim 1.

9. A compound as claimed in claim 1, of the formula

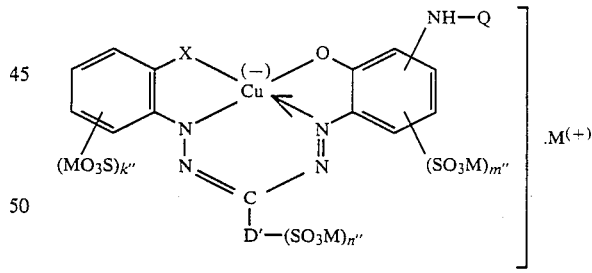

in which
k'' is the number zero, 1 or 2,
m'' is the number zero or 1 and
n'' is the number zero, 1 or 2,
the sum of (k''+m''+n'') being equal to 2 or 3, and
D' is a benzene ring which, in addition to the grouping —(SO$_3$M)$_{n''}$, is unsubstituted or substituted by a methoxy, ethoxy or a methyl or a chlorine.

10. A compound as claimed in claim 1, wherein X is an oxy or a carbonyloxy.

11. A compound as claimed in claim 1, wherein X is a carbonyloxy.

12. A compound as claimed in claim 1, of the formula

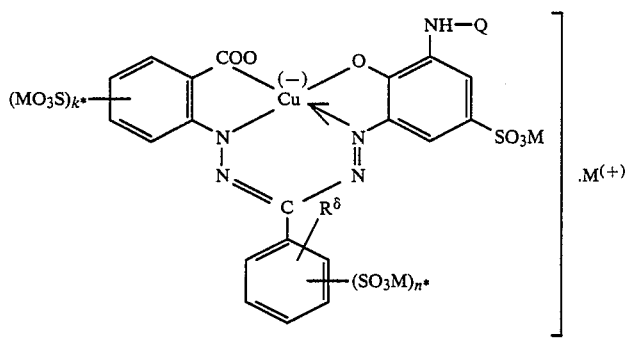

in which
k* is the number zero or 1 and
n* is the number zero or 1,
the sum of (k*+n*) being the number 1 or 2, and
R⁸ is hydrogen or methyl, methoxy or ethoxy or chlorine.

13. A compound as claimed in claim 1, of the formula

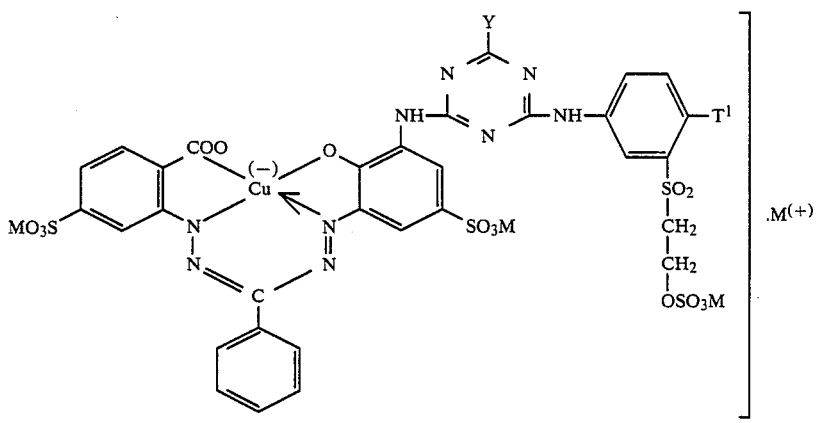

in which X is chlorine or fluorine and T¹ is β-sulfatoethylamino, N-methyl-N-(β-sulfatoethyl)-amino, N-[β-(β'-carboxyethyl)-carboxamido]-ethyl-amino, β-sulfoethylamino or β-sulfatoethylthio.

14. A compound as claimed in claim 1, wherein Y is chlorine.

15. A compound as claimed in claim 1, wherein Y is fluorine.

16. A compound as claimed in claim 1, wherein Z is vinyl or β-sulfatoethyl.

17. A compound as claimed in claim 1, wherein G is an amino of the general formula —N(R)— where R is hydrogen, methyl or ethyl.

18. A compound as claimed in claim 1, wherein K is an ethylene or an n-propylene or the formula —CH₂—CH₂—O—CH₂—CH₂— or —CH₂—CH₂—NH—CO—CH₂—CH₂—.

19. A compound as claimed in claim 1, wherein W is sulfato, sulfo or carboxy.

20. A compound as claimed in claim 1, wherein a sulfo group of (MO₃S)$_{k''}$— or (MO₃S)$_{k*}$— is bonded in the meta- or para-position, relative to the group X to the benzene nucleus.

* * * * *